(12) United States Patent
Song et al.

(10) Patent No.: US 11,953,365 B2
(45) Date of Patent: Apr. 9, 2024

(54) SWITCHING DEVICE AND A LIQUID LEVEL DETECTION APPARATUS EMPLOYING THE SWITCHING DEVICE

(71) Applicant: Chengli Li, Suzhou (CN)

(72) Inventors: Erjian Song, Suzhou (CN); Hanqin Zhou, Suzhou (CN)

(73) Assignee: Chengli Li, Suzhou (CN)

( * ) Notice: Subject to any disclaimer, the term of this patent is extended or adjusted under 35 U.S.C. 154(b) by 430 days.

(21) Appl. No.: 17/512,414

(22) Filed: Oct. 27, 2021

(65) Prior Publication Data

US 2023/0132194 A1 Apr. 27, 2023

(30) Foreign Application Priority Data

Oct. 22, 2021 (CN) .......................... 202111232665.1
Oct. 22, 2021 (CN) .......................... 202122559404.2

(51) Int. Cl.
*H01H 35/18* (2006.01)
*G01F 23/36* (2006.01)
*G01F 23/44* (2006.01)

(52) U.S. Cl.
CPC .............. *G01F 23/36* (2013.01); *G01F 23/44* (2013.01); *H01H 35/18* (2013.01)

(58) Field of Classification Search
CPC .......... G01F 23/68; G01F 23/44; G01F 23/36; H01H 35/18; H01H 36/02; H01H 35/186; H01H 36/0013; H01H 36/0033
See application file for complete search history.

(56) References Cited

U.S. PATENT DOCUMENTS

| 5,950,487 A | * | 9/1999 | Maresca, Jr. | ......... G01F 23/686 250/577 |
| 7,471,206 B1 | * | 12/2008 | Ellerman | ................ A47G 33/12 340/623 |
| 2017/0148593 A1 | * | 5/2017 | Solak | ...................... H01H 35/18 |
| 2018/0136031 A1 | * | 5/2018 | Moon | ..................... H01H 35/18 |

* cited by examiner

*Primary Examiner* — Ahmed M Saeed
(74) *Attorney, Agent, or Firm* — Chen Yoshimura LLP

(57) ABSTRACT

A switching device includes a first enclosure containing a switch, a rod-shaped second enclosure having a second end connected to the first enclosure, a detector unit in the second enclosure, and a float disposed around the second enclosure and capable of moving along it. As the float moves from the first end of the second enclosure toward the second end, when the float enters a first position range, a first position sensor senses the float and transmits a first sensing signal to a detection circuit; when the float enters a second position range, a second position sensor senses the float and transmits a second sensing signal to the detection circuit. The detection circuit close a switch in response to the second sensing signal to turn on an external appliance. The switching device is flexible, reliable, and inexpensive to produce.

13 Claims, 5 Drawing Sheets

SWITCHING DEVICE AND A LIQUID LEVEL DETECTION APPARATUS EMPLOYING THE SWITCHING DEVICE

BACKGROUND OF THE INVENTION

Field of the Invention

This invention relates to liquid level detection, and in particular, it relates to a switching device and a liquid level detection apparatus employing the switching device.

Description of Related Art

Conventional liquid level detection apparatus typically employ a reed switch or a Hall sensor. These devices, however, have certain shortcomings. For example, liquid level detection devices using reed switches have relatively low precision and durability. Those using Hall sensors have a complex structural design and high power consumption.

More specifically, using Hall sensor in liquid level detection apparatus has the following disadvantages: It requires the magnetic component in the float of the liquid level detection apparatus to maintain a constant spatial relationship with the Hall sensor in the non-sensing direction (e.g., when the Hall sensor is designed to sense the vertical position of the magnetic component, the spatial relationship between the Hall sensor and the magnetic component in other directions perpendicular to the vertical direction is required to be constant). Otherwise, the signal generated by the Hall sensor will be inaccurate due to the characteristics of the Hall sensor. In addition, Hall sensors have relatively high power consumption, and relatively low consistency, sensitivity and temperature characteristics.

Using reed switch in liquid level detection apparatus has the following disadvantages: Because the precision of reed switch measurement is relatively low, it is difficult to ensure that products in the same batch have consistent Gauss values (magnetic field intensity) due to cost considerations. In addition, reed switches have relatively low durability and high failure rate.

SUMMARY

To solve these problems, the present invention is directed to a switching device, and a liquid level detection apparatus employing such switching device, that substantially obviate one or more of the problems due to limitations and disadvantages of the related art.

To achieve the above objects, the present invention provides a switching device, which includes: a first enclosure, containing a switch; a second enclosure, having a second end connected to the first enclosure, the second enclosure having a rod shape; a detector unit, disposed in the second enclosure, including a first position sensor located at a first position, a second position sensor located at a second position, and detection circuit coupled to the first position sensor, the second position sensor and the switch; and a float, disposed around an exterior of the second enclosure, and configured to move along the second enclosure. As the float moves from a first end of the second enclosure toward the second end of the second enclosure, when the float enters a first position range, the first position sensor is configured to sense the float and transmits a first sensing signal to the detection circuit; when the float enters a second position range, the second position sensor is configured to sense the float and transmits a second sensing signal to the detection circuit. The detection circuit is configured to close the switch in response to the second sensing signal. The first position range is a sensing range of the first position sensor, and the first position is within the first position range, and wherein the second position range is a sensing range of the second position sensor, and the second position is within the second position range.

In some embodiments, as the float moves from the second end of the second enclosure toward the first end of the second enclosure, when the float has moved away from the second position range and has not entered the first position range, the detection circuit is configured to keep the switch closed; when the float enters the first position range, the first position sensor is configured to sense the float and transmits the first sensing signal to the detection circuit, and the detection circuit is configured to open the switch in response to the first sensing signal.

In some embodiments, the first position is near the first end of the second enclosure and the second position is near the second end of the second enclosure.

In some embodiments, the switching device further includes a power supply circuit disposed in the first enclosure and coupled to the switch and the detector unit; and a power plug assembly, having a first end coupled to the power supply circuit and the switch, a second end configured to be coupled to an external power source, and a third end configured to be coupled to an external appliance. The power plug assembly and the power supply circuit supply power to the switch and the detector unit, respectively, such that the switch controls the external appliance via the power plug assembly.

In some embodiments, the float includes an enclosure, disposed around the exterior of the second enclosure and configured to move along the second enclosure; a groove formed on the enclosure; and a magnetic component retained in the groove. When the float moves along the second enclosure, the first position sensor and the second position sensor are configured to sense a magnetic field of the magnetic component to generate the first and second sensing signals, respectively.

In some embodiments, the switching device further includes a stop member connected to the first end of the second enclosure, configured to limit a range of motion of the float along the second enclosure.

In some embodiments, the magnetic component has a ring shape, and the groove has a shape that matches the ring shape of the magnetic component.

In some embodiments, the first position sensor and the second position sensor are magnetoresistance sensors.

In some embodiments, the detection circuit includes a first operational amplifier, having an inverting input terminal coupled to an output of the first position sensor, and a non-inverting input terminal coupled to a threshold voltage; a second operation amplifier, having an inverting input terminal coupled to another threshold voltage, a non-inverting input terminal coupled to an output of the second position sensor and an output terminal of the first operational amplifier, and an output terminal coupled to its non-inverting input terminal and the switch; and a unidirectional conducting element, having an input terminal coupled to the non-inverting input terminal of the second operational amplifier, and an output terminal coupled to the output terminal of the first operational amplifier.

In some embodiments, as the float moves from the first end of the second enclosure toward the second end of the second enclosure, when the float enters the first position range, the first position sensor transmits the first sensing signal to the inverting input terminal of the first operational amplifier, causing the first operational amplifier to output a low voltage; and when the float enters the second position range, the second position sensor transmits the second sensing signal to the non-inverting input terminal of the second operational amplifier, causing the second operational amplifier to output a high voltage which closes the switch.

In some embodiments, as the float moves from the second end of the second enclosure toward the first end of the second enclosure, when the float has moved away from the second position range and has not entered the first position range, neither the first position sensor nor the second position sensor transmits the sensing signals to the detection circuit, and the second operational amplifier outputs a high voltage to keep the switch closed; when the float enters the first position range, the first position sensor transmits the first sensing signal to the inverting input terminal of the first operational amplifier, causing the first operational amplifier to output a low voltage, and the output low voltage of the first operation amplifier causes the second operational amplifier to output a low voltage, which opens the switch.

In some embodiments, the power supply circuit further includes: a voltage converter, having an input end coupled to the power plug assembly and an output end coupled to the switch to supply power to the switch; and a voltage regulator, having an input end coupled to the output end of the voltage converter and an output end coupled to the detector unit to supply power to the detector unit.

In another aspect, the present invention provides a liquid level detection apparatus, including the above-described switching device.

BRIEF DESCRIPTION OF THE DRAWINGS

Preferred embodiments of the present invention are described with reference to the drawings. These drawings serve to explain the embodiments and their operating principle, and only illustrate structures that are necessary to the understanding of the principles of the invention. These drawings are not necessarily to scale. In the drawings, like features are designated by like reference symbols.

DETAILED DESCRIPTION OF PREFERRED EMBODIMENTS

Preferred embodiments of the present invention are described below with reference to the drawings. These drawings and descriptions explain embodiments of the invention but do not limit the invention. The described embodiments are not all possible embodiments of the present invention. Other embodiments are possible without departing from the spirit and scope of the invention, and the structure and/or logic of the illustrated embodiments may be modified. Thus, it is intended that the scope of the invention is defined by the appended claims.

In the descriptions below, terms such as "including" are intended to be open-ended and mean "including without limitation", and can include other contents. "Based on" means "at least partly based on." "An embodiment" means "at least one embodiment." "Another embodiment" means "at least another embodiment," etc.

The main problems to be solved by embodiments of the present invention include: to improve precision and reliability of liquid level detection, to improve the life of the liquid level detection apparatus, and to reduce manufacturing cost.

To solve these problems, embodiments of the present invention provides a switching device which includes: a first enclosure containing a switch, a rod-shaped second enclosure, a detector unit in the second enclosure, and a float disposed around the second enclosure and capable of moving along it. As the float moves from the first end of the second enclosure toward the second end, when the float enters a first position range, a first position sensor senses the float and transmits a first sensing signal to a detection circuit; when the float enters a second position range, a second position sensor senses the float and transmits a second sensing signal to the detection circuit. The detection circuit close a switch in response to the second sensing signal to turn on an external appliance.

Figure 1:
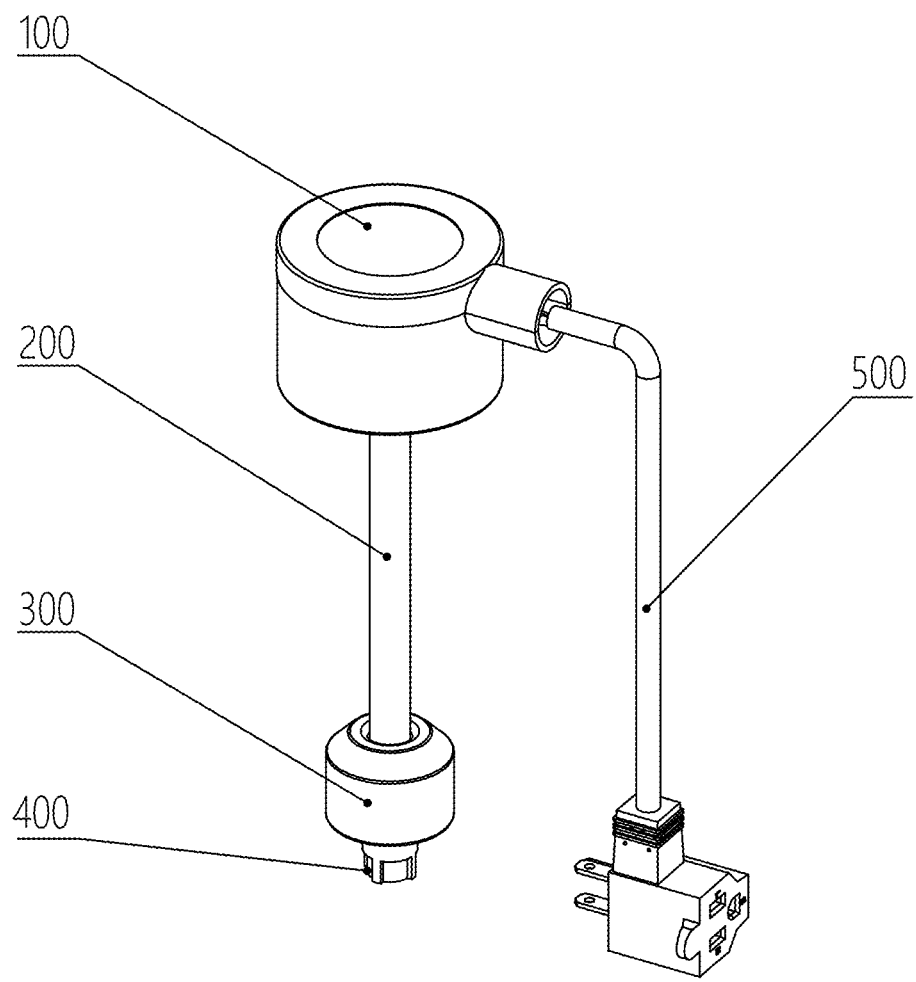
FIG. 1 illustrates the overall structure of a switching device according to embodiments of the present invention.
Figure 2:
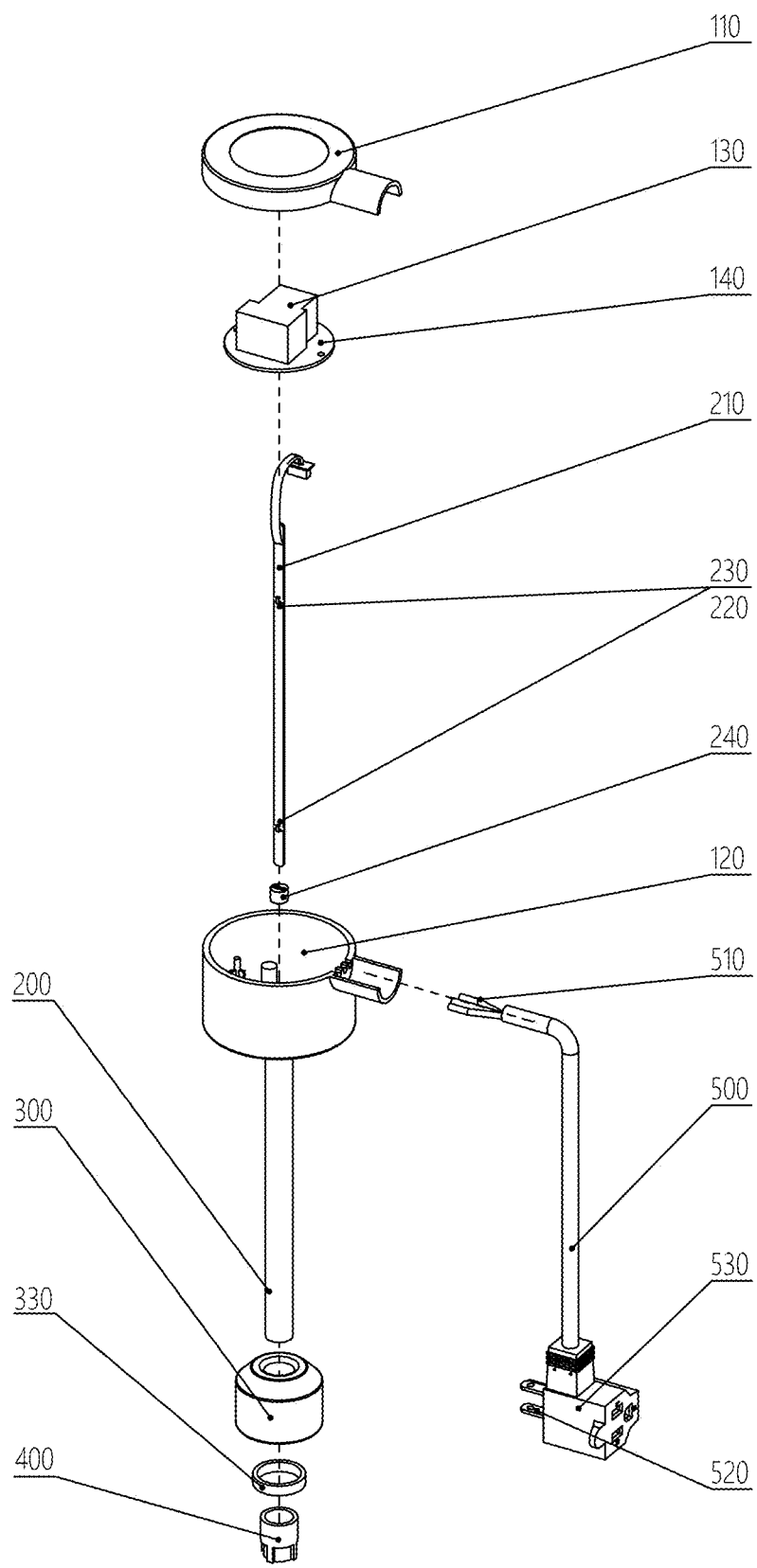
FIG. 2 is an exploded view of the switching device.

As shown in FIGS. 1 and 2, a switching device for a liquid level detection apparatus includes a first enclosure 100, a second enclosure 200, detector unit, float 300, stop member 400, and power plug assembly 500. The first enclosure 100 has a switch 130 and a power supply circuit assembly 140 disposed within it. The second enclosure 200 is connected to the first enclosure 100 and has a rod shape. The float 300 is disposed around the second enclosure 200 and is able to move along it.

In this embodiment, the first enclosure 100 includes a base 120 and an upper cover 110. The switch 130 and power supply circuit assembly 140 are disposed in the base 120. The base 120 and the upper cover 110 are joined to each other with a liquid-tight seal. The power supply circuit assembly 140 includes a power supply circuit, which is electrically coupled to the switch 130. In preferred embodiments, the switch 130 is a relay.

Figure 4:
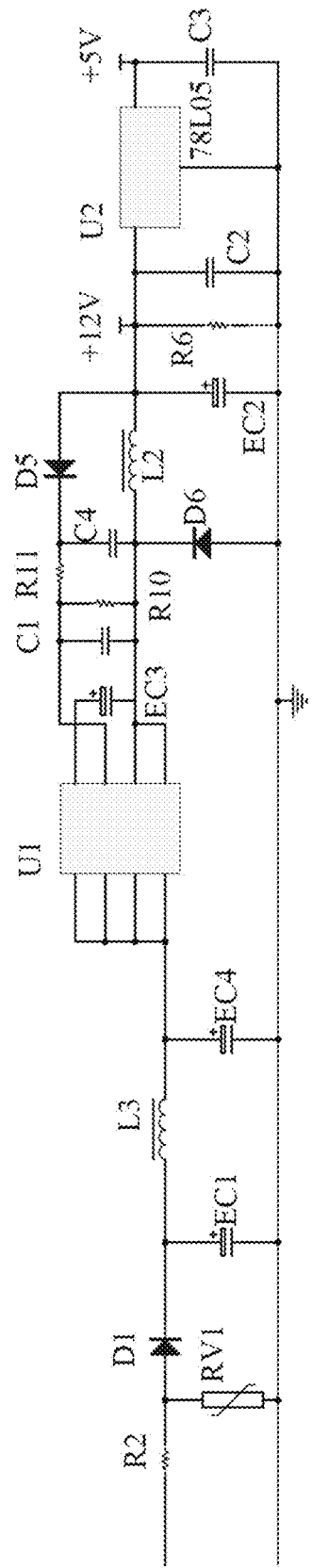
FIG. 4 is a circuit diagram of a power supply circuit of the switching device.

FIG. 4 illustrates the power supply circuit according to one embodiment. The circuit includes at least a voltage converter U1, a voltage regulator U2, and various electrical components coupled to the voltage converter U1 and voltage regulator U2. The input end of the voltage converter U1 is coupled to the power plug assembly 500, and the output end of the voltage converter U1 supplies power to the switch 130 (e.g., the 12V working voltage shown in FIG. 4). The input end of the voltage regulator U2 is coupled to the output end of the voltage converter U1, and the output end of the voltage regulator U2 supplies power to the detector unit (e.g., the 5V working voltage shown in FIG. 4).

In this embodiment, the power supply circuit employs a non-isolated power supply system, which is low cost and easy to design. It also has high conversion efficiency and superior stability, which ensures a stable voltage output when the liquid level detection apparatus is working normally.

As shown in FIG. 2, in this embodiment, the detector unit is disposed within the second enclosure 200, and includes a detection circuit board assembly 210, a first position sensor 220, a second position sensor 230, and a circuit assembly protection buffer 240. The detection circuit board assembly 210 is band shaped, with the first position sensor 220 located at a first position of the detection circuit board assembly 210 and the second position sensor 230 located at a second position of the detection circuit board assembly 210. The detection circuit board assembly 210 includes a detection circuit, which is coupled to the first position sensor 220 and the second position sensor 230, as well as the switch 130 and power supply circuit within the first enclosure 100. The circuit assembly protection buffer 240 is disposed at one end of the detection circuit board assembly 210 to protect the detection circuit board assembly 210. The other end of the detection circuit board assembly 210 is coupled to the power supply circuit assembly 140.

Figure 5:
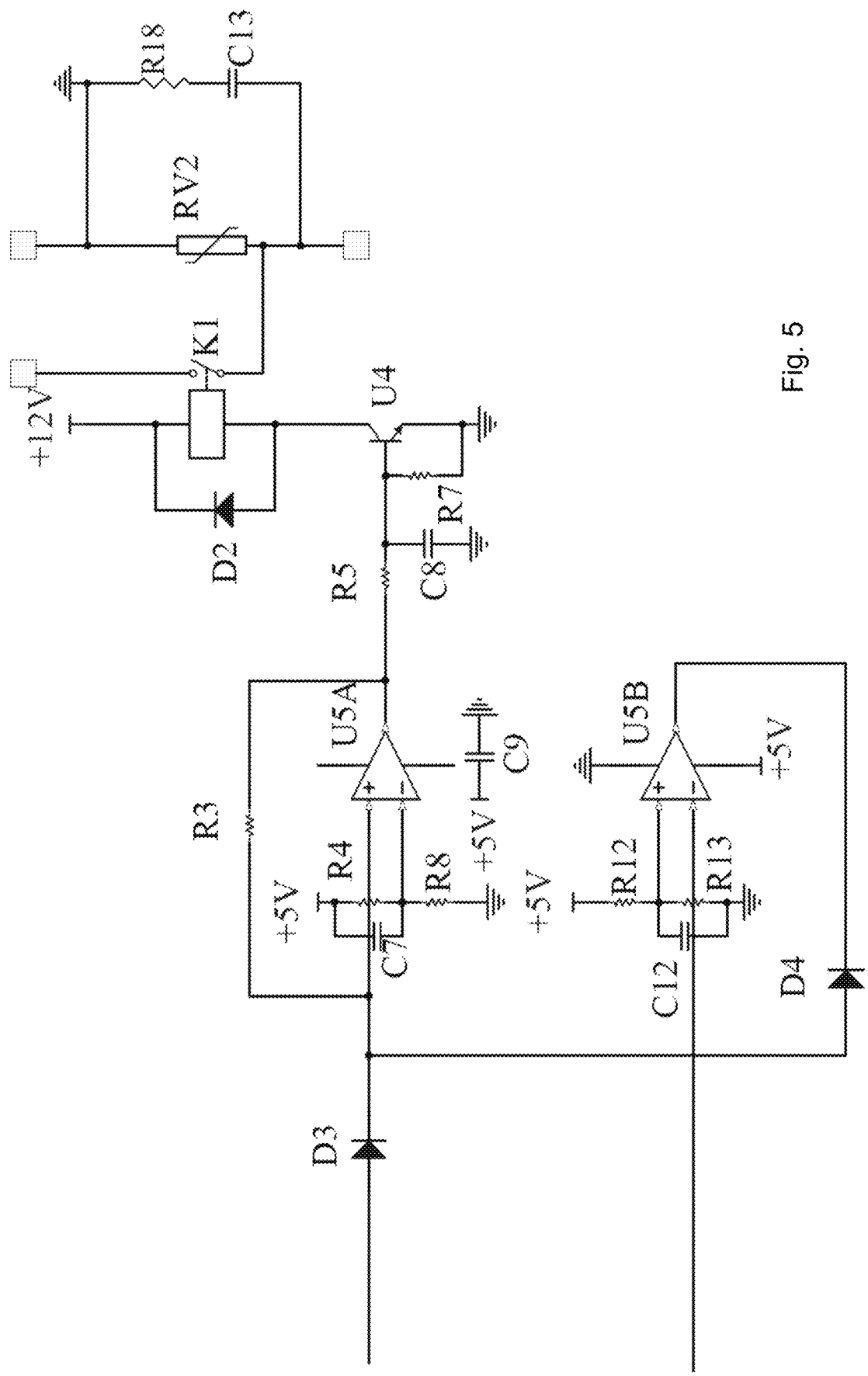
FIG. 5 is a circuit diagram of a detection circuit of the switching device.

FIG. 5 illustrates the detection circuit of the embodiment, which includes at least a first operational amplifier U5B, a second operational amplifier U5A, and a unidirectional conducting element D4. In this embodiment, the inverting input terminal of the first operational amplifier U5B is coupled to the output of the first position sensor 220, and the non-inverting input terminal of the first operational amplifier U5B is coupled to a threshold voltage. The inverting input terminal of the second operational amplifier U5A is coupled to a threshold voltage, and the non-inverting input terminal of the second operational amplifier U5A is coupled to the output of the second position sensor 230 and the output terminal of the first operational amplifier U5B. The output terminal of the second operational amplifier U5A is coupled to its non-inverting input terminal and the switch 130. In this embodiment, the unidirectional conducting element D4 is preferably a diode, with its input terminal coupled to the non-inverting input terminal of the second operational amplifier U5A, and its output terminal coupled to the output terminal of the first operational amplifier U5B.

Further, as shown in FIG. 5, the output terminal of the second operational amplifier U5A is coupled via transistor U4 to the switch 130, and the switch 130 is coupled to the varistor RV2 which is coupled to the external device.

More specifically, in this embodiment, the first position along the second enclosure 200 is near a first end (i.e., the lower end) of the second enclosure 200, and the second position is near a second end (i.e., the upper end) of the second enclosure 200, so that the first position sensor 220 is configured to detect a low liquid level and the second position sensor 230 is configured to detect a high liquid level.

Figure 3:
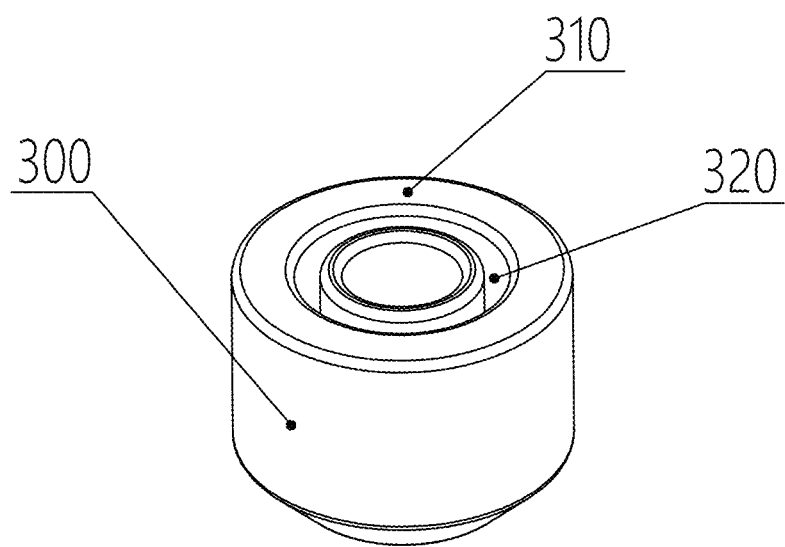
FIG. 3 illustrates the structure of the float of the switching device.

As shown in FIGS. 2 and 3, the float 300 includes an enclosure 310, a groove 320 formed on the enclosure 310, and magnetic component 330. As shown in FIGS. 1 and 2, the float 300 is disposed around the exterior of the second enclosure 200, and can move along the second enclosure 200. In use, the density of the float 300 is lower than that of the liquid being measured, so that the float 300 can float on the liquid surface and slide along the second enclosure 200 based on the change in liquid level.

In this embodiment, the magnetic component 330 has a ring shape, and the shape of the groove 320 matches the shape of the magnetic component 330, so that the magnetic component 330 is securely retained in the groove 320 and moves vertically with the shell 310.

As shown in FIGS. 1 and 2, after the float 300 is mounted around the second enclosure 200, the stop member 400 is mounted at the first end of the second enclosure 200, so as to limit the range of motion of the float 300.

To avoid problems of conventional technology, the liquid level detection apparatus according to embodiments of the present invention employs advanced tunnel magnetoresistance sensing technology. This technology has superior characteristics: low power consumption, and relatively high consistency, sensitivity and temperature characteristics. It is not subject to the constraint of the Hall sensor that requires the magnetic component in the float to maintain a constant spatial relationship with the Hall sensor in the non-sensing direction. In embodiments of the present invention, the first position sensor 220 and the second position sensor 230 are both magnetoresistance sensors, which sense the magnetic field intensity of the magnetic component 330.

As shown in FIGS. 1 and 2, the first end 510 of the power plug assembly 500 is coupled to the power supply circuit assembly 140, its second end 520 (e.g. plug prongs) is configured to be coupled to an external power source (not shown in the drawings), and its third end 530 (e.g. plug receptacle) is configured to be coupled to an external appliance (e.g., a water pump). The external power source supplies power to the switch 130 and the detector unit, respectively, via the power plug assembly 500 and the power supply circuit. Via the power plug assembly 500, the switch 130 controls the external appliance to operate.

The working principles of the switching device for the liquid level detection apparatus are as follows.

As the float 300 moves upward from the first end of the second enclosure 200 toward the second end (i.e., the liquid level is rising), when the float 300 moves into a first position range, the first position sensor 220 senses the magnetic field of the magnetic component 330 of the float 300 and transmits a first sensing signal to the detection circuit. When the float 300 moves into a second position range, the second position sensor 230 senses the magnetic field of the magnetic component 330 and transmits a second sensing signal to the detection circuit. The switch 130 closes in response to the second sensing signal, which causes the external appliance to operate. Thus, when the external appliance is a water pump, the component 130 closes in response to the second sensing signal, which turns on the pump to remove liquid from the liquid container.

In this embodiment, the first position range is the sensing range of the first position sensor 220, and the first position is within the first position range; the second position range is the sensing range of the second position sensor 230, and the second position is within the second position range.

More specifically, when the float 300 moves upwards to enter the first position range, the first position sensor 220 transmits the first sensing signal to the inverting input terminal of the first operational amplifier U5B, causing the first operational amplifier to output a low voltage. This low voltage is not capable of causing the switch 130 to close; as a result, the liquid level continues to rise.

When the float 300 continues to move upwards and enters the second position range, the second position sensor 230 transmits the second sensing signal to the non-inverting input terminal of the second operational amplifier U5A, causing the second operational amplifier to output a high voltage. This high voltage causes the switch 130 to close; as a result, the switch 130 causes the external appliance to operate to remove liquid from the container, so that the liquid level drops.

Now, as the float 300 moves downward from the second end of the second enclosure 200 toward the first end (i.e., the liquid level is dropping), when the float 300 has moved away from the second position and has not reached the first position range, neither the first position sensor 220 nor the second position sensor 230 senses the magnetic field of the magnetic component 330, so the switch 130 stays closed and the external appliance continues to operate. When the float 300 continues to move downward and enters the first position range, the first position sensor 220 senses the magnetic field of the magnetic component 330 and transmits the first sensing signal to the detection circuit. The switch 130 opens in response to the first sensing signal, causing the external appliance to stop operating. Thus, when the external appliance is a water pump, the switch 130 opens in response to the first sensing signal, causing the pump to stop removing liquid from the container.

More specifically, when the float 300 moves away from the second position and before it reaches the first position range, neither the first position sensor 220 nor the second position sensor 230 transmits the sensing signals to the detection circuit. Because the non-inverting input terminal of the second operational amplifier U5A is coupled to its output terminal, the second operational amplifier U5A outputs a high voltage, which keeps the switch 130 closed. As a result, the external appliance continues to remove liquid and the liquid level continues to drop.

When the float 300 continues to move and enters the first position range, the first position sensor 220 transmits the first sensing signal to the inverting input terminal of the first operational amplifier U5B, causing the first operational amplifier U5B to output a low voltage. Because the non-inverting input terminal of the second operational amplifier U5A is coupled to the output terminal of the first operational amplifier U5B via the unidirectional conducting element D4, this causes the second operational amplifier U5A to output a low voltage, which in turn causes the switch 130 to open. Therefore, the external appliance stops removing liquid, and the liquid level stops dropping.

The detection circuit disclosed here can appropriately convert the output signals from the magnetoresistance sensors, to stably and reliably control the switch 130 (e.g. relay) so as to cause the switch to close when the liquid level reaches the second position, and to cause the switch to open when the liquid level is below the first position. This reduces the possibilities of false triggers, and enhances reliable, precise, and rapid response to the magnetoresistance sensor signals to provide control signals to the external appliance.

In another aspect, the present invention provides a liquid level detection apparatus, which includes the above-described switching device. In operation, the second enclosure 200 and the float 300 of the switching device are placed in the space to be measured, and the first enclosure 100 is placed outside of the space to be measured, to accomplish precise liquid level detection.

Embodiments of the present invention employs advanced sealing technology to improve the life and reliability of the switching device and the liquid level detection apparatus, and at the same time, achieves precise liquid level detection. This expands the application of the switch and the liquid level detection apparatus.

While the present invention is described above using specific examples, these examples are only illustrative and do not limit the scope of the invention. It will be apparent to those skilled in the art that various modifications, additions and deletions can be made to the switching device and liquid level detection apparatus of the present invention without departing from the spirit or scope of the invention.

What is claimed is:

1. A switching device, comprising:
   a first enclosure, containing a switch;
   a second enclosure, having a second end connected to the first enclosure, the second enclosure having a rod shape;
   a detector unit, disposed in the second enclosure, including a first position sensor located at a first position, a second position sensor located at a second position, and detection circuit coupled to the first position sensor, the second position sensor and the switch; and
   a float, disposed around an exterior of the second enclosure, and configured to move along the second enclosure;
   wherein as the float moves from a first end of the second enclosure toward the second end of the second enclosure, when the float enters a first position range, the first position sensor is configured to sense the float and transmits a first sensing signal to the detection circuit; when the float enters a second position range, the second position sensor is configured to sense the float and transmits a second sensing signal to the detection circuit;
   wherein the detection circuit is configured to close the switch in response to the second sensing signal;
   wherein the first position range is a sensing range of the first position sensor, and the first position is within the first position range, and wherein the second position range is a sensing range of the second position sensor, and the second position is within the second position range.

2. The switching device of claim 1, wherein as the float moves from the second end of the second enclosure toward the first end of the second enclosure, when the float has moved away from the second position range and has not entered the first position range, the detection circuit is configured to keep the switch closed; wherein when the float enters the first position range, the first position sensor is configured to sense the float and transmits the first sensing signal to the detection circuit, and
   wherein the detection circuit is configured to open the switch in response to the first sensing signal.

3. The switching device of claim 1, wherein the first position is near the first end of the second enclosure and the second position is near the second end of the second enclosure.

4. The switching device of claim 1, further comprising:
   a power supply circuit, disposed in the first enclosure and coupled to the switch and the detector unit; and
   a power plug assembly, having a first end coupled to the power supply circuit and the switch, a second end configured to be coupled to an external power source, and a third end configured to be coupled to an external appliance;
   wherein the power plug assembly and the power supply circuit supply power to the switch and the detector unit, respectively, and whereby the switch controls the external appliance via the power plug assembly.

5. The switching device of claim 1, wherein the float includes:
   an enclosure, disposed around the exterior of the second enclosure and configured to move along the second enclosure;
   a groove formed on the enclosure; and
   a magnetic component retained in the groove;
   wherein when the float moves along the second enclosure, the first position sensor and the second position sensor are configured to sense a magnetic field of the magnetic component to generate the first and second sensing signals, respectively.

6. The switching device of claim 1, further comprising:
   a stop member connected to the first end of the second enclosure, configured to limit a range of motion of the float along the second enclosure.

7. The switching device of claim 5, wherein the magnetic component has a ring shape, and the groove has a shape that matches the ring shape of the magnetic component.

8. The switching device of claim 1, wherein the first position sensor and the second position sensor are magnetoresistance sensors.

9. The switching device of claim 2, wherein the detection circuit includes:
- a first operational amplifier, having an inverting input terminal coupled to an output of the first position sensor, and a non-inverting input terminal coupled to a threshold voltage;
- a second operation amplifier, having an inverting input terminal coupled to another threshold voltage, a non-inverting input terminal coupled to an output of the second position sensor and an output terminal of the first operational amplifier, and an output terminal coupled to its non-inverting input terminal and the switch; and
- a unidirectional conducting element, having an input terminal coupled to the non-inverting input terminal of the second operational amplifier, and an output terminal coupled to the output terminal of the first operational amplifier.

10. The switching device of claim 9, wherein as the float moves from the first end of the second enclosure toward the second end of the second enclosure:
- when the float enters the first position range, the first position sensor transmits the first sensing signal to the inverting input terminal of the first operational amplifier, causing the first operational amplifier to output a low voltage; and
- when the float enters the second position range, the second position sensor transmits the second sensing signal to the non-inverting input terminal of the second operational amplifier, causing the second operational amplifier to output a high voltage which closes the switch.

11. The switching device of claim 9, wherein as the float moves from the second end of the second enclosure toward the first end of the second enclosure:
- when the float has moved away from the second position range and has not entered the first position range, neither the first position sensor nor the second position sensor transmits the sensing signals to the detection circuit, and wherein the second operational amplifier outputs a high voltage to keep the switch closed;
- when the float enters the first position range, the first position sensor transmits the first sensing signal to the inverting input terminal of the first operational amplifier, causing the first operational amplifier to output a low voltage, and wherein the output low voltage of the first operation amplifier causes the second operational amplifier to output a low voltage, which opens the switch.

12. The switching device of claim 4, wherein the power supply circuit further includes:
- a voltage converter, having an input end coupled to the power plug assembly and an output end coupled to the switch to supply power to the switch; and
- a voltage regulator, having an input end coupled to the output end of the voltage converter and an output end coupled to the detector unit to supply power to the detector unit.

13. A liquid level detection apparatus, comprising the switching device of claim 1.

* * * * *